3,140,259
CLARIFICATION APPARATUS
Earl M. Kelly, Hillsborough, Burlingame, Calif., assignor, by mesne assignments, to The Eimco Corporation, Salt Lake City, Utah, a corporation of Delaware
Filed Sept. 14, 1959, Ser. No. 839,948
5 Claims. (Cl. 210—195)

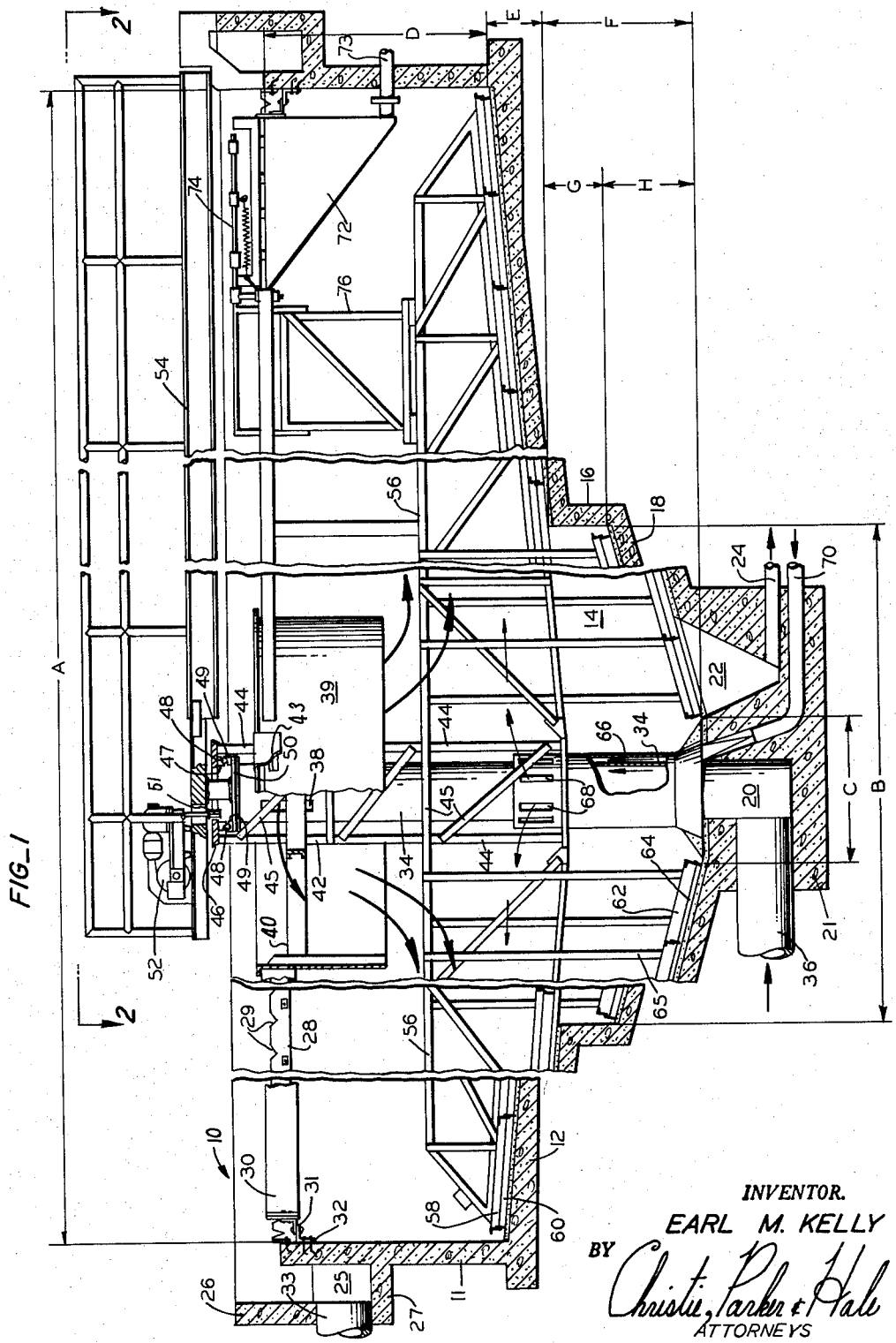

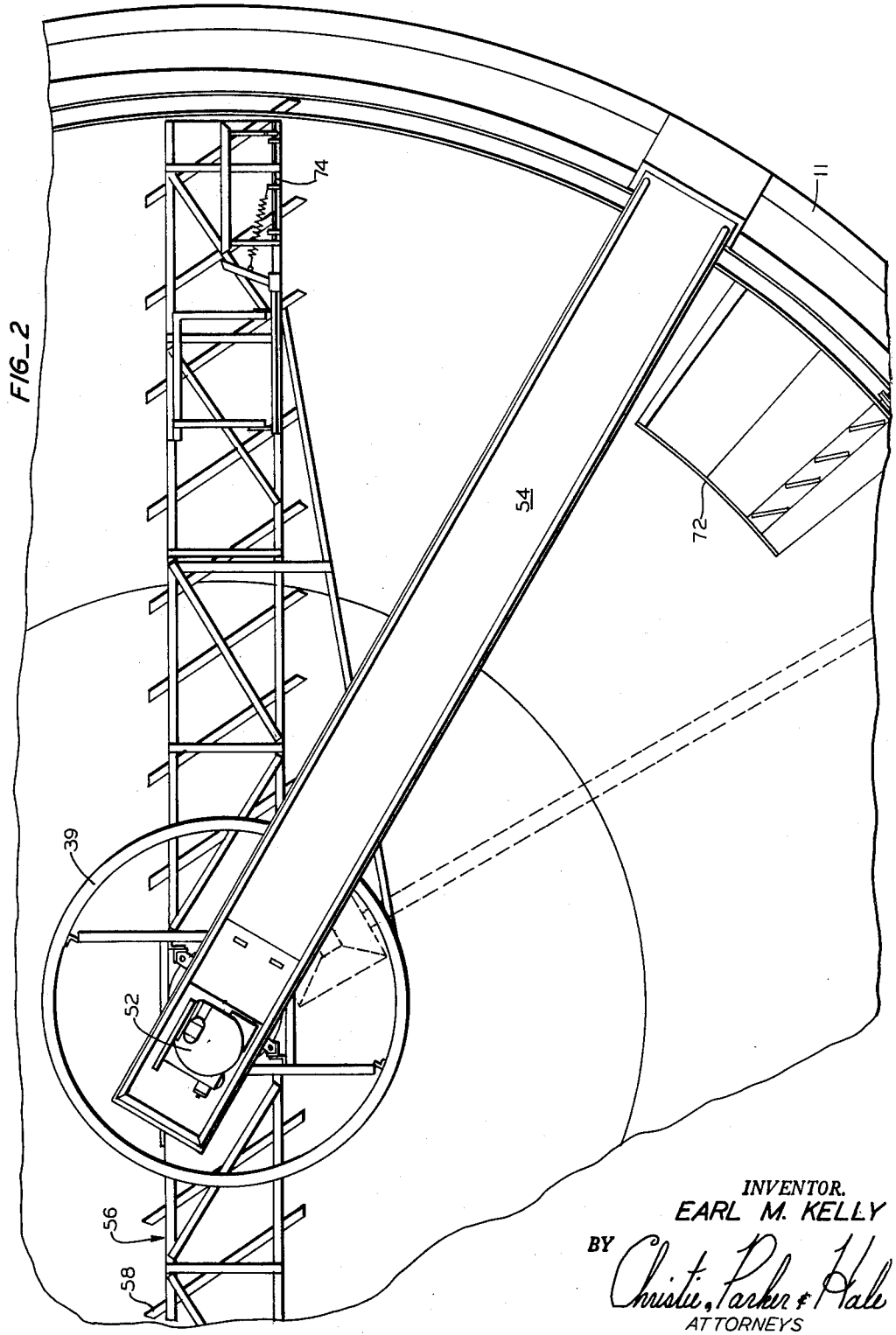

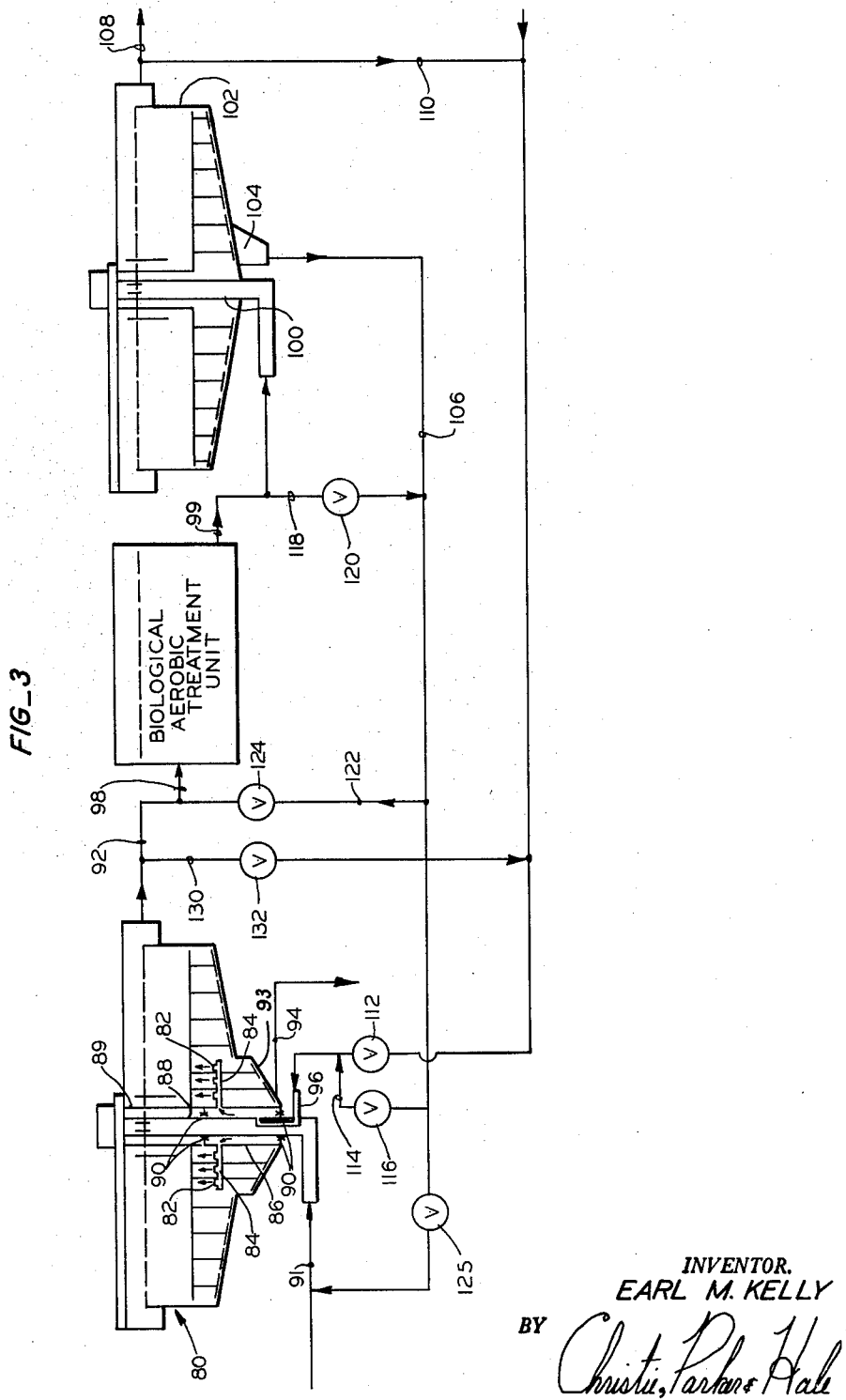

This invention relates to the removal of settleable solids in a concentrated condition from liquids such as sewage, industrial wastes, and the like.

The present day sewage system in most communities uses a stream of water as a transportation system to carry wastes and impurities from scattered locations to a sewage treatment plant, which acts as an unloading station for suspended and dissolved household and industrial organic and inorganic wastes. After the water is "unloaded" or otherwise sufficiently purified to be inoffensive, it is discharged in an open body of water such as a river or other suitable water course, or is otherwise suitably disposed of.

At the present time, it is common practice to employ sedimentation tanks for the removal of settleable solids at a typical sewage plant. Usually, at least partial purification of the transporting water is effected in a primary settling unit called a primary clarifier tank in which solids carried by the water settle to the bottom of the tank and are removed as a sludge, with clarified effluent being taken from the top of the primary clarifier. Sometimes the primary clarifier effects the required unloading of the transporting water so that it can be discharged directly into a water course. However, in those plants where a higher degree of purification is required, effluent from the primary clarifier is normally subjected to a secondary treatment, such as activated sludge, biological trickling filters, chemical precipitation, or a combination of these methods, whereby additional solids and dissolved matter remaining in the transporting water are conditioned for further removal in a subsequent sedimentation step normally carried out in a tank known as a secondary or final clarifier. In some areas the primary clarifier is by-passed or omitted, and the sewage is subjected directly to activated sludge processes, trickling filter, chemical precipitation, or a combination of these methods prior to treatment in a settling tank.

Whatever the details of the sewage treatment in the various plants, the primary objective is the same, namely, the removal of organic and inorganic dissolved and suspended solids to such a degree as to make the transporting water acceptable for final discharge. The solids unloaded at the sewage plant are in the form of a sludge, which must be further treated for final disposal, usually in sludge digesters under anaerobic conditions. The concentration of sludge which must be handled varies, of course, with individual areas and operating conditions. Normally, however, the typical sewage sludge is fed to the digesters at a concentration of between about 2% to about 6% solids. This means that 92% to 98% of the volume handled by the sludge digesters is required for liquid, which is ultimately returned to the sewage stream. Thus, sewage plants strive for the production of sludge with a maximum density to reduce handling problems, and to reduce the size of the sludge digesters, which represent a substantial portion of the total cost, maintenance, and operation of the plants.

The density of solids settling in a liquid pool ordinarily increases with the amount of time allowed for settling. However, a serious limitation on the density of primary sludge which may be settled from raw sewage is that the sewage becomes septic. As the sewage ages in the tank, the available dissolved oxygen in the water is used up by aerobic decomposition processes, causing the sewage to become stale and finally undergo anaerobic decomposition, which produces large volumes of offensive gases that are a nuisance to the surrounding community, and which rise in the liquid in the settling tank to buoy sludge to the surface and prevent it from settling to a maximum density. Thus, prior to this invention, it has been necessary to withdraw sluge from a settling tank long before it reaches a maximum density to prevent it from becoming putrefactive.

Recently, U.S. Patent 2,850,449 issued for a process aimed at obtaining high sludge density without anaerobic decomposition. According to the patent, sludge is withdrawn from a settling tank at a concentration far below that which normally would obtain without anaerobic decomposition, and is fed in this greatly diluted state into a separate external thickener where the dilute sludge is reported to settle to a density higher than that normally obtained.

One of the disadvantages of the patented treatment is that it requires a separate thickener of substantial size to handle the dilute sludge, and from an operating standpoint, requires careful supervision to insure that proper concentrations of solids are fed to the thickener as taught by the patent to obtain satisfactory results.

This invention provides improved apparatus and processes for obtaining sludge of maximum density without requiring oversized thickeners, and in fact in its preferred form uses no separate thickener, thus requiring less equipment than is now normally used.

Briefly, the present invention provides ways and means whereby higher concentrations of sludge may be attained in a sedimentation tank by increased storage detention, yet the inherent dangers of septic sludge are avoided.

The invention is predicated on the discovery that settleable sludge can be detained and further concentrated by providing a barrier of oxidative material to block upward migration of solids from the final thickening zone.

As indicated previously, raw sewage cannot be retained in a settling tank for more than a few hours without becoming septic and undergoing anaerobic decomposition, which produces offensive gasses that buoy sludge particles to the surface of the tank and prevent sludge from settling to a maximum density. This invention provides improved apparatus and process which permits the retention of sewage sludge in a settling tank for periods varying from a relatively short time up to and beyond 24 hours without interference from anaerobic decomposition, so the settled sludge is more highly concentrated and so sludge digester volume may be correspondingly reduced.

Moreover, the preferred form of the invention permits prolonged retention of sewage sludge in a single tank or unit, thereby avoiding having to transport settled sludge from a clarifier tank to a separate thickening tank, as is done in conventional practice prior to this invention, often with the result of breaking up the agglomerated sludge particles and making it difficult to re-settle the sludge to high density.

In terms of method, the invention contemplates removing settleable solids from a liquid by maintaining a body of liquid in a pool in which solids settle to the bottom. A first stream of liquid with solids is introduced into the pool where solids settle. Settled solids are removed from the pool at a point below that where the first stream of liquid enters. A second stream of liquid is introduced to the pool at a point between where the first stream of liquid enters the pool and the bottom of the pool so that solids settling from the first stream of liquid must pass through the second liquid stream.

In the preferred form, the second liquid stream is a minor proportion of the total liquid introduced to the pool, say 5% to 20%, but has a greater capacity per unit volume for inhibiting anaerobic decomposition than the liquid with which it mixes on entering the pool. It is further preferred that the second stream of liquid have greater capacity per unit volume for inhibiting anaerobic decomposition than the first liquid stream entering the pool.

In the presently preferred method, the second liquid stream has more oxidizing power per unit volume than the first because it contains more dissolved air, oxygen, chlorine, ozone, hydrogen peroxide, or other suitable oxidant. Alternatively, the second stream may contain any well known agent for inhibiting anaerobic decomposition, such as zinc chloride, which is not an oxidant in the normal sense.

The second liquid stream can be obtained from a variety of sources, such as the effluent of the primary clarifier, returned sludge from the final clarifier, oxidative liquor discharge from the aeration tanks of an activated sludge process, the discharge from the conventional trickling filtration, the effluent from a final clarifier, or an external water source such as tap water or water from a stream, or the like.

In terms of apparatus, the invention includes a settling tank having a zone in which solids settle from a pool of liquid in the tank to form a sludge. Means are provided for introducing a first stream of liquid with solids into the tank, and means are provided for removing settled solids from the tank at a point below that where the first liquid stream enters the tank. The apparatus also includes means for introducing a second stream of liquid into the tank at a point between where the first liquid stream enters the tank and where settled solids are removed. The apparatus also includes means for removing clarified liquid from the tank.

In the preferred form of the invention, the tank includes an annular solids settling zone with a bottom that slopes gently to a relatively deep sludge thickening well having a more sharply sloping bottom which slopes downwardly and inwardly to a sludge pocket from which thickened sludge is removed. The first stream of liquid is introduced in the center of the tank a substantial distance above the thickening well. Means are provided for introducing the second stream of liquid directly over the thickening well so that it spreads radially outwardly to form a layer of fresh liquor over an underlying blanket of sludge in the thickening well so that solids settling to the thickening well pass through the fresh liquor.

These and other aspects of the invention will be more fully understood from the following detailed description taken in conjunction with the accompanying drawings, in which:

FIG. 1 is a sectional elevation, partially broken away of the presently preferred embodiment of the invention;

FIG. 2 is a fragmentary plan view taken on line 2—2 of FIG. 1; and

FIG. 3 is a schematic flow sheet showing an alternate embodiment of the invention, and various ways for supplying the second stream of liquid to the settling tank.

Referring to FIGS. 1 and 2, a settling tank 10 includes a vertical circular wall 11 disposed around an annular settling bottom 12 which slopes gently inwardly and downwardly to the upper and outer edge of a relatively deep and centrally located thickening well 14 which includes a vertical circular wall 16 formed integrally with the periphery of a circular thickening well bottom 18 sloping downwardly and inwardly relatively steeply to a vertical influent bore 20 formed in a central base 21. An upwardly opening sludge pocket 22 is formed in the central base adjacent the influent opening to be below the lowest point of the thickening well bottom. A sludge pipe 24 extends horizontally from the bottom of the sludge pocket to carry sludge from the tank to a point of further treatment, such as sludge digesters (not shown).

An annular effluent overflow launder 25 is formed between the outside of the upper edge of the tank wall 11 and a vertical circular launder wall 26 secured and sealed at its lower edge to the exterior of the tank wall 11 by a horizontal lip 27 formed integrally with the tank and launder walls. The upper edge of the launder wall is somewhat higher than that of the tank wall. The launder receives liquid overflowing an annular weir 28 secured to the inside of the upper edge of tank wall 11. The weir has a plurality of radially spaced V-shaped notches 29, which determine the water level overflowing into the launder. Normally each notch is two inches deep and the tank is designed for flow with 1½ inch head on each weir notch. An annular vertical baffle 30 is spaced a slight distance inside of the weir and secured by Z-shaped brackets 31 and bolts 32 to the upper edge of the tank wall 11. The upper edge of the baffle terminates slightly above the weir and the lower edge of the baffle terminates a slight distance below the upper edge of tank wall 11. The baffle helps to maintain a smooth surface on the liquid overflowing the weir and reduces the tendency for light solids to be carried over in the effluent, which is removed through an effluent pipe 33 connected to the bottom of the launder.

A vertical, stationary, hollow, inner influent column 34 is mounted with its lower end disposed in the influent bore 20 in the tank base. The upper end of the influent column terminates at a level about the same as the upper edge of the launder wall 26. A horizontal influent pipe 36 opens into the lower end of the inner influent column so that raw sewage is discharged into the center of the tank as a first liquid stream from longitudinal slots 38 radially spaced around the upper portion of the influent column. An annular skirt or feedwell 39, spaced from, and disposed coaxially around, the upper end of the influent column, is secured by horizontal feedwell supports 40 to an open rotatable cage 42 disposed around the influent column. The upper edge of the feedwall is slightly above the operating level of the tank and includes a scum outlet 43 at the operating level to permit scum to flow on the surface of the water out of the feedwell. The feedwell extends downwardly about one-third of the depth of the tank side wall and the cage extends downwardly about two-thirds of the tank depth. The cage includes vertical members 44 spaced around the inner influent column and connected together by diagonal and horizontal cross braces 45. The upper end of the cage is secured to the periphery of an internal ring gear 46 which has a depending race 47 resting on ball bearings 48 disposed on an upwardly extending race 49 mounted on a cover 50 on the upper end of the inner influent column. The ring gear and depending cage are rotated about the longitudinal axis of the influent column by a pinion gear 51, which engages the ring gear and which is driven by a conventional drive unit 52 mounted on the inner end of a horizontal walkway 54 resting at its inner end on a pier 56 disposed on the cover on the upper end of the influent column. The outer end of the walkway rests on the upper edge of the launder wall 26.

A pair of substantially horizontal and radially extending arms 56 are each attached at their respective inner ends to the lower portion of the cage at about the level of the upper edge of wall 16, which defines the top of the thickening well. A plurality of scraper blades 58, each carrying a downwardly extending adjustable brass squeegee 60, are attached to the under side of the arms so the squeegees scrape the settling bottom 12, which has a slope of about one inch per foot. As shown most clearly in FIG. 2, the blades are set so that as the arm is rotated slowly in a clockwise direction, settled solids are gently raked over the bottom 12 into the thickening well 14.

A plurality of blades 62, each carrying an adjustable brass squeegee 64 under its lower edge, are attached by vertical reinforced posts 65 to the inner portions of the arms and are disposed to scrape settled sludge in the thickening well along the bottom 18 into the sludge pocket 22 as the arms are rotated in a clockwise direction (as viewed in FIG. 2). The bottom of the thickening well has a slope of about three inches per foot.

An oxidative liquor outer column 66 is disposed coaxially around the lower portion of the inner influent column and is sealed at its lower end to the tank base. The upper end of the outer column is closed, but a plurality of radially spaced longitudinal slots 68 adjacent the upper end of the outer column admit a second liquid stream into the tank between the point of sludge removal and the point of entry of the first liquid stream (raw sewage) from the inner influent column. An oxidative liquor pipe 70 extends inwardly and horizontally through the tank base and turns upwardly to open into the annular space between the outer and inner columns. The liquor pipe is connected to a suitable source of "fresh" liquor as described in more detail with respect to FIG. 3.

A conventional scum box 72 is mounted on the inside and upper edge of the tank wall 11 and a scum pipe 73 extends inwardly through the tank wall to open into the bottom of the scum box for the removal of scum which is skimmed from the surface of the liquid in the tank by a conventional scum skimming device 74 carried by an upright support 76 mounted on the outer end of the right arm (as viewed in FIG. 1). Floating scum is moved outwardly from the scum outlet in the feedwell by an elongated and horizontal scum skimmer attached at its inner end to the feedwell adjacent the scum outlet and at its outer end to the scum skimming device.

In the operation of the apparatus shown in FIGS. 1 and 2 raw sewage flows through the influent pipe, up the influent column, and down under the feedwell as shown by the arrows in FIG. 1. The velocity of the sewage is substantially reduced as it flows in the open pool of liquid in the tank. The heavier particles settle directly into the thickening well. The lighter solid particles are carried toward the periphery of the tank, until the liquid velocity is such that many of the particles settle gently to the annular portion of the tank bottom. Clarified effluent overflows the weir into the launder, from which it is discharged to final disposal (not shown), if sufficiently pure, or carried to further treatment as described more fully with respect to FIG. 3, if further purification is required.

Oxidative liquor flows through the liquor pipe 70, up the annular space between the outer column and influent column, and flows as shown by the arrows in FIG. 1 radially outwardly in the tank through the slots 68 in the upper end of the outer column to form a layer of "fresh" liquid over the sludge in the thickening well. The amount of oxidative liquor flow ordinarily is between 5% and 25% of the total liquid flow through the tank. However, its value can be adjusted to meet various conditions, such as the type of sewage being treated, and the property of the oxidative liquor itself. The term "oxidative" is used to mean either the capacity of supplying oxygen for the biochemical oxygen demand (BOD) of the sewage, or of inhibiting anaerobic decomposition with an anaerobic bacteria inhibitor, such as zinc chloride. If the oxidative liquor uses dissolved oxygen, the retention of the oxygen can be enhanced, and a reduction in anaerobic decomposition obtained, by the use of small quantities of water soluble nitrates, such as calcium, potassium, or sodium nitrate. Preferably, the oxidative liquor is aerated in the presence of the soluble nitrate, which can be used in relatively low concentration, such as 5 to 10 p.p.m. parts of oxidative liquor. For best results the oxidative liquor should have a greater capacity per unit volume for inhibiting anaerobic decomposition than the liquid with which it mixes on entering the tank, and preferably is greater than that of the raw sewage introduced to the feedwell.

As shown most clearly in FIG. 1, the flow of the raw incoming sewage is the dominant of the two liquid streams entering the tank, and the second or oxidative liquid stream is forced to flow in a relatively thin layer and spread outwardly over the central portion of the tank. Thus, solid particles settle directly through the layer of "fresh" or oxidative liquid and into the thickening well, or are raked from the outer portion of the tank into the stream of fresh liquid. Thus, prior to entering the thickening well, solid particles are "freshened," or provided with an increased supply of oxygen or other suitable agent to inhibit anaerobic decomposition, so that the solid particles can be retained for an extended period of time in the thickening well to produce a sludge of high density. However, the flow of oxidative liquor is kept sufficiently low so as not to interfere with the efficient settling of the solid particles. To this end, it is desirable to use an oxidative liquor with as much "oxidative" power as practical.

The dense sludge is removed from the sludge pocket through the sludge pipe by a sludge pump (not shown) and transferred to a sludge digester system (not shown), which can be substantially smaller than that previously used due to the increased density of the sludge.

Although the dimensions of the apparatus shown in FIGS. 1 and 2 are not entirely critical, the following table gives a general range of dimensions which are satisfactory for treating tanks of various capacities. The dimensions given under the various letters in the table are for the dimensions indicated by corresponding letters on FIG. 1.

*Table*

| Tank Dia. A, Feet | Capacity Average, 700 g.p.d./ sq. ft. m.g.d. | Dimensions | | | | | | | Sludge Hopper vol., c.f. | Ret. Liquor, g.p.m. | Inf. Col. I.D., Inches | Out. Col. I.D., Inches |
|---|---|---|---|---|---|---|---|---|---|---|---|---|
| | | B | C | D | E | F | G | H | | | | |
| | | Feet | | | Inches | | | | | | | |
| 30 | .49 | 12 | 3 | 9 | 9 | 48 | 34.5 | 13.5 | 380 | 48 | 10 | 16 |
| 40 | .88 | 16 | 3 | 9 | 12 | 48 | 28.5 | 19.5 | 610 | 85 | 12 | 18 |
| 50 | 1.38 | 20 | 4 | 9 | 15 | 48 | 24 | 24 | 888 | 134 | 16 | 22 |
| 60 | 1.98 | 24 | 4 | 9 | 18 | 54 | 24 | 30 | 1,350 | 192 | 18 | 24 |
| 70 | 2.70 | 28 | 4 | 9 | 21 | 60 | 24 | 36 | 1,947 | 262 | 24 | 30 |
| 80 | 3.52 | 32 | 5 | 9 | 24 | 64.5 | 24 | 40.5 | 2,678 | 342 | 30 | 36 |
| 90 | 4.45 | 36 | 5 | 9 | 27 | 70.5 | 24 | 46.5 | 3,486 | 431 | 30 | 36 |
| 100 | 5.50 | 40 | 5 | 9 | 30 | 76.5 | 24 | 52.5 | 4,604 | 532 | 36 | 42 |
| 110 | 6.70 | 44 | 6 | 9 | 33 | 81 | 24 | 57 | 5,842 | 650 | 36 | 52 |
| 120 | 7.90 | 48 | 6 | 9 | 36 | 81 | 18 | 63 | 6,335 | 770 | 42 | 48 |
| 130 | 9.33 | 52 | 6 | 9 | 39 | 81 | 12 | 69 | 6,682 | 910 | 42 | 48 |
| 140 | 10.80 | 56 | 6 | 9 | 42 | 87 | 12 | 75 | 8,150 | 1,044 | 42 | 48 |

The apparatus of FIG. 3 includes a primary tank 80 which is of construction substantially identical with that shown in FIGS. 1 and 2, except that the second or "oxidative" stream of liquid is introduced in the tank through a plurality of diffusers 82 mounted along horizontally and radially extending arms 84 connected at their respective inner ends to a rotatable outer column 86 surrounding an influent column 88. The outer column is connected to the lower end of the rotatable cage 89, and closed at each end by sliding seals 90 to be rotatable around the inner influent column. Thus, the cage, outer column, and distributor arms rotate together so that the second stream of liquid is uniformly distributed over a relatively large area. Raw sewage enters the influent column through a first line 91, and clarified effluent is removed through a second line 92. Sludge is taken from a deep thickening well 93 in the bottom of the tank 80 out of sludge line 94. The second stream of liquid is introduced into the lower end of the outer column 86 through a third line 96.

Clarified effluent flows through the second line 92 into the inlet 98 of a biological aerobic treatment unit, which may be the conventional activated sludge process, step aeration, high-rate activated sludge treatment, or conventional trickling filtration, and such modifications thereof as bio-filtration and high-rate filtration.

The aerated liquid and solids leave the aerobic treatment unit through a discharge line 99 which is connected to an influent column 100 of a secondary or final clarifier tank 102, which may be of construction identical with that of the primary tank, or the deep thickening well and means for introducing the second stream of oxidative liquor may be omitted as shown in FIG. 3. Additional solids settle to the bottom of the final clarifier tank to form a secondary sludge, which is raked to a sludge pocket 104 and carried by a secondary sludge line 106 back to be admitted with the raw sewage to the influent of the primary clarifier tank, or to the oxidative inlet line 96.

The effluent from the final clarifier is discharged through final effluent line 108 to further disposal, or is returned through a line 110 to the third line 96, which supplies oxidative liquor in a thin layer over the blanket of sludge in the thickening well of the primary clarifier. The third line includes a first valve 112 which normally is open, but which may be closed so that oxidative liquid in the form of secondary sludge can be introduced through a by-pass line 114 connected through a second valve 116 to the secondary sludge line 106. The discharge line 99 from the aerobic treatment unit is connected by a second by-pass line 118 through a third valve 120 to the secondary sludge line 106, which in turn is connected by a return sludge line 122 through a fourth valve 124 to the inlet 98 of the aerobic treatment unit. A fifth valve 125 controls the amount of secondary sludge introduced with the raw sewage into the influent of the primary tank. The effluent line 92 from the primary tank is also connected by a line 130 through a valve 132 to the oxidative liquor line 96.

In a typical municipal sewage plant the influent raw sewage contains about 300 parts per million solids, and the secondary sludge from the final clarifier is about 2,000 parts per million solids, and the ratio of raw sewage to secondary sludge entering the influent of the primary tank is about ten to one, when secondary sludge is the sole source of "oxidative" liquor. Municipal raw sewage can vary between 100 and 600 p.p.m., depending on water supply and expense. Raw industrial waste, such as material from meat packing plants or canneries may contain suspended solids as high as 10,000 p.p.m. although usually the concentration is in the vicinity of 1,000 to 2,000 p.p.m. On those cases where the raw influent entering the primary tank is higher than normal in suspended solids, the amount of oxidative liquor, or its "oxidative" power is correspondingly increased.

As can be seen from FIG. 3, the second stream, or oxidative liquor, can be supplied from the effluent of the final clarifier, which usually has less than ten parts per million solids; it can be secondary sludge from the final clarifier; it can be mixed liquor from the discharge of the aerobic treatment unit; it can be effluent from the primary tank; or any combination of the foregoing sources. Oxidative liquor from any of the foregoing sources will contain more dissolved oxygen than the liquid in the raw sewage, and hence will have a greater capacity for inhibiting anaerobic decomposition.

The second stream of liquid can also be ordinary tap water or water from a river or other source. For good results, the second stream of liquid should have more capacity per unit volume for inhibiting anaerobic decomposition than the liquid in the vicinity of where the second stream is admitted to the tank. Thus, the second stream of liquid should have more anaerobic decomposition inhibiting power than the liquid in the tank under the feedwell and above the inlet for the second stream of liquid. Results are further enhanced if the anaerobic decomposition inhibiting property of the second liquid stream is even greater, say larger than that of the incoming raw sewage.

I claim:

1. Apparatus for removing settleable solids from a liquid in a waste disposal process comprising a settling tank having a bottom and a side wall, an inlet for introducing a raw feed stream of liquid with solids into the tank, an effluent launder on the tank for removing clarified liquid and maintaining an operating level for a pool of liquid in the tank, a baffle disposed around and spaced from the inlet to form a feed well between the inlet and the baffle, and an outer clarification zone between the baffle and the side wall of the tank, the baffle having an opening below the operating level of the pool to permit feed liquid with solids to flow from the feed well into the clarification zone where solids settle to the bottom to form a sludge, a thickening well adjoining the clarification zone and disposed below it, means for moving settled sludge from the bottom of the clarification zone into the thickening well where the sludge is retained and thickened, means for removing thickened sludge from the thickening well, and means for introducing a stream of oxidative liquid into the tank independently of the feed stream and at a level below said opening in the baffle where the feed stream flows from the feed well into the clarification zone.

2. Apparatus for removing settleable solids from a liquid in a waste disposal process comprising a settling tank having a bottom and a side wall, an inlet for introducing a raw feed stream of liquid with solids into the tank, an effluent launder on the tank for removing clarified liquid and maintaining an operating level for a pool of liquid in the tank, a baffle disposed around and spaced from the inlet to form a feed well between the inlet and the baffle, and an outer clarification zone between the baffle and the side wall of the tank, the baffle having an opening below the operating level of the pool to permit feed liquid with solids to flow from the feed well into the clarification zone where solids settle to the bottom to form a sludge, a thickening well adjoining the clarification zone and disposed below it, means for moving settled sludge from the bottom of the clarification zone into the thickening well where the sludge is retained and thickened, means for removing thickened sludge from the thickening well, and means for introducing a stream of oxidative liquid into the tank independently of the feed stream and at a level below said opening in the baffle where the feed stream flows from the feed well into the clarification zone and adjacent the top of settled sludge in the thickening well.

3. Apparatus for removing settleable solids from a liquid in a waste disposal process comprising a primary settling tank having a primary clarification zone with a bottom on which solids settle to form a primary sludge, a thickening well adjoining the primary clarification zone bottom and disposed below it, means for moving settled primary sludge from the bottom of the primary clarification zone into the thickening well, means for introducing a feed stream of liquid with solids into the primary clarification zone, means for removing settled and thickened sludge from the thickening well, means for removing a primary effluent from the primary clarification zone, a secondary settling tank having a secondary clarification zone with a bottom on which solids settle to form a secondary sludge, means for introducing primary effluent into the secondary clarification zone, means for removing clarified secondary effluent from the secondary clarification zone, means for removing secondary sludge from the secondary tank, and means for introducing a stream of secondary sludge into the primary clarification zone independently of the feed stream and at a level below where the feed stream enters the primary clarification zone.

4. Apparatus for removing settleable solids from a liquid in a waste disposal process comprising a primary settling tank having a primary clarification zone with a bottom on which solids settle to form a primary sludge, a thickening well adjoining the primary clarification zone bottom and disposed below it, means for moving settled primary sludge from the bottom of the primary clarification zone into the thickening well, means for introducing a feed stream of liquid with solids into the primary clarification zone, means for removing settled and thickened sludge from the thickening well, means for removing a primary effluent from the primary clarification zone, a biologic aerobic treatment unit having an input and an output, means for introducing effluent from the primary clarification zone to the input, a secondary settling tank having a secondary clarification zone with a bottom on which solids settle to form a secondary sludge, means for connecting the output of the aerobic treatment unit to the secondary clarification zone, means for removing clarified secondary effluent from the secondary clarification zone, means for removing secondary sludge from the secondary tank, and means for introducing a stream of secondary sludge into the primary clarification zone independently of the feed stream and at a level below where the feed stream enters the primary clarification zone.

5. Apparatus for removing settleable solids from a liquid in a waste disposal process comprising a settling tank having a bottom and a side wall, an inlet for introducing a raw feed stream of liquid with solids into the tank, an effluent launder on the tank for removing clarified liquid and maintaining an operating level for a pool of liquid in the tank, an annular baffle disposed around and spaced from the inlet to form a feed well between the inlet and the baffle, and an outer clarification zone between the baffle and the side wall of the tank, the baffle terminating above the bottom of the tank and being open at its bottom below the operating level of the pool to permit feed liquid with solids to flow from the feed well into the clarification zone where solids settle to the bottom to form a sludge, a thickening well adjoining the clarification zone and disposed below it and under the feed well, means for moving settled sludge from the bottom of the clarification zone into the thickening well where the sludge is retained and thickened, means for removing thickened sludge from the thickening well, and means for introducing a stream of oxidative liquid into the tank independently of the feed stream and at a level below the bottom of the baffle where the feed stream flows from the feed well into the clarification zone.

References Cited in the file of this patent

UNITED STATES PATENTS

| | | |
|---|---|---|
| 2,141,133 | Gibbs | Dec. 20, 1938 |
| 2,289,112 | Fischer | July 7, 1942 |
| 2,348,126 | Green | May 2, 1944 |
| 2,624,704 | Fischer | Jan. 6, 1953 |
| 2,679,477 | Kivari et al. | May 25, 1954 |
| 2,713,026 | Kelly et al. | July 12, 1955 |
| 2,779,730 | Kelly et al. | Jan. 29, 1957 |

OTHER REFERENCES

"The Disposal of Sewage" by T. H. P. Veal, third edition revised, 1956, Chapman & Hall Ltd., London, England, pages 84 and 85. (Copy available in Scientific Library, U.S. Patent Office.)

"Water Supply and Sewerage," Ernest W. Steel, fourth edition 1960, McGraw-Hill Book Co., New York, pages 503–506. (Copy available in Scientific Library, U.S. Patent Office.)